G. W. BOWERS.
COIN CONTROLLED WEIGHING MACHINE.
APPLICATION FILED APR. 7, 1909.
979,372.
Patented Dec. 20, 1910.
2 SHEETS—SHEET 1.
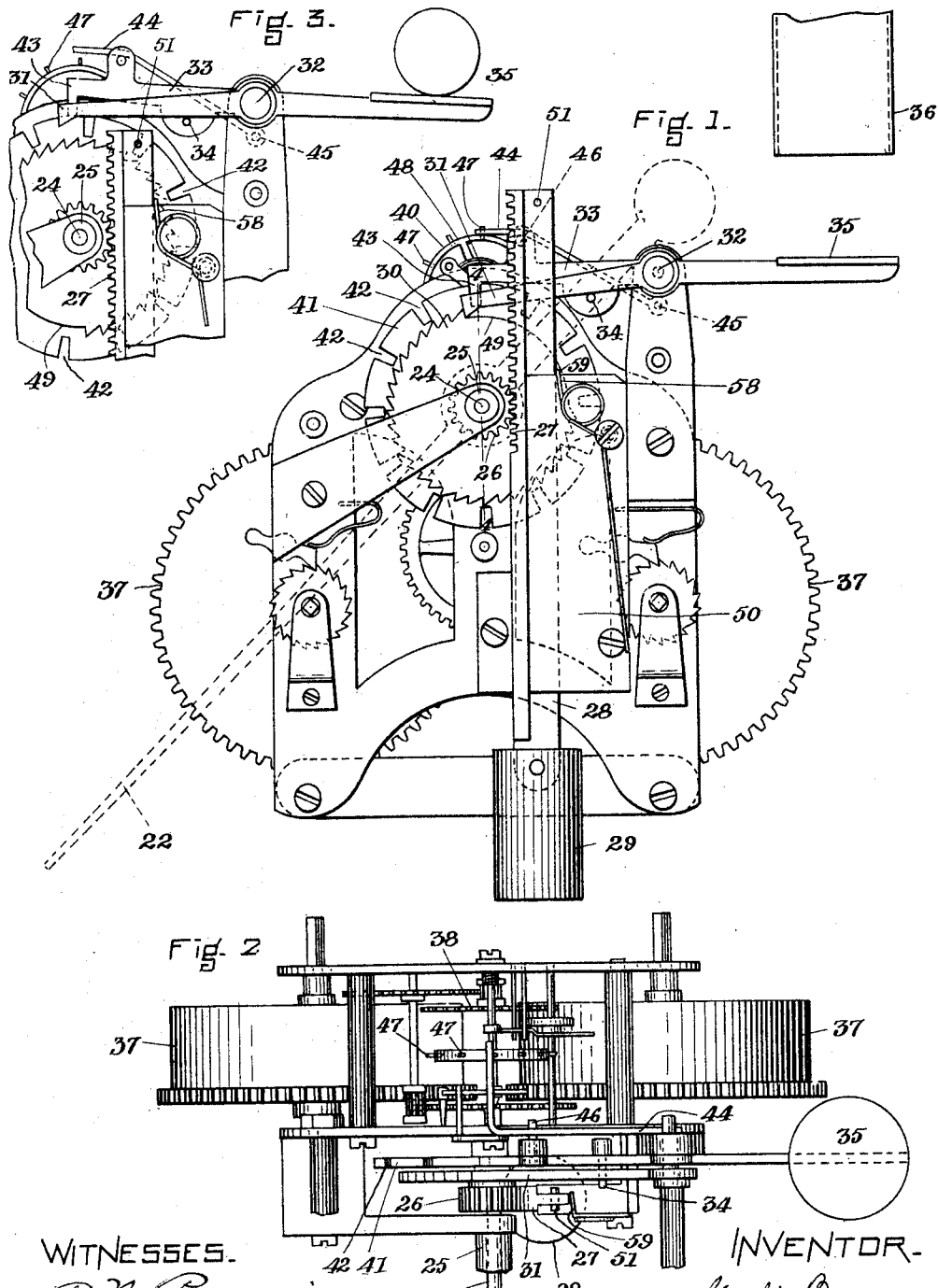

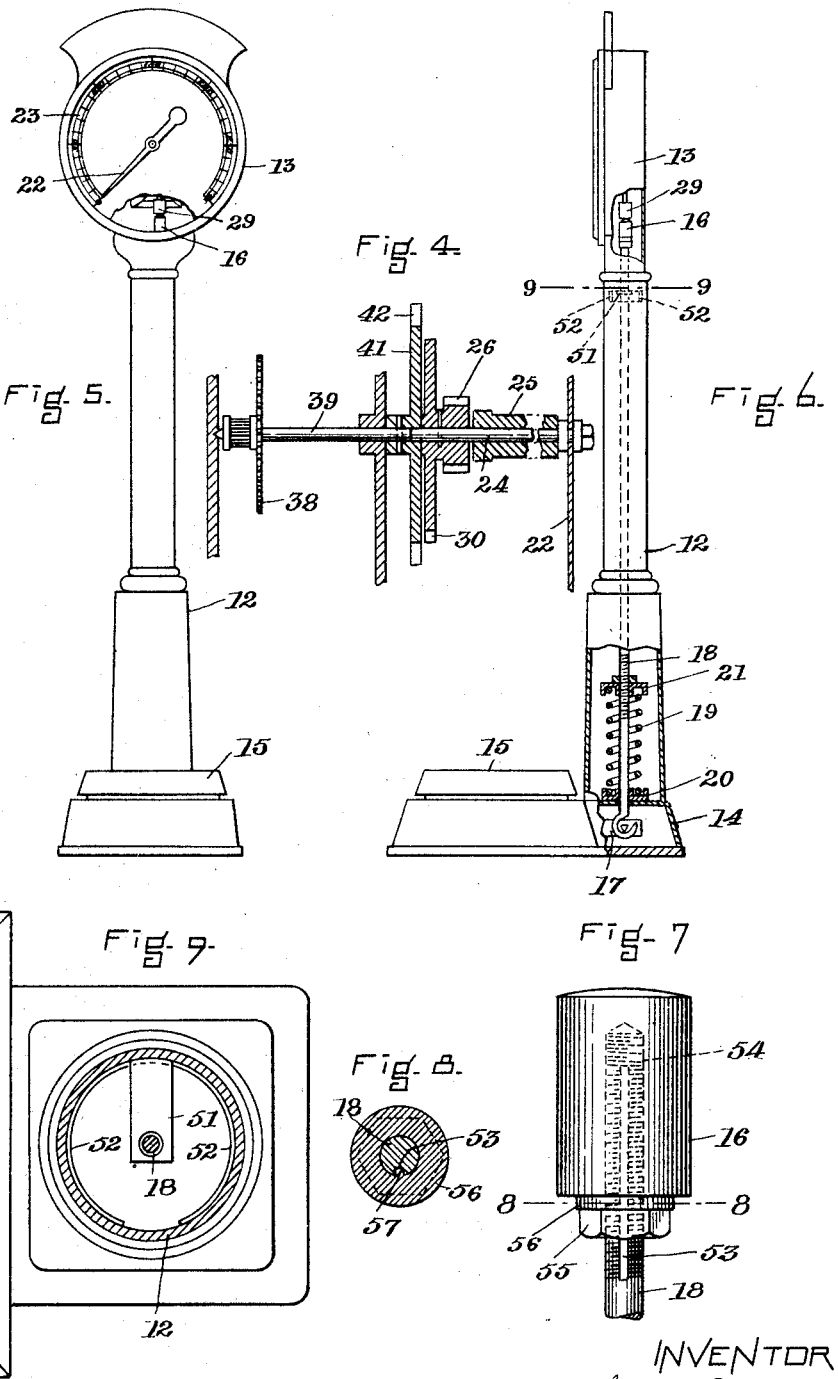

UNITED STATES PATENT OFFICE.

GEORGE W. BOWERS, OF SOMERVILLE, MASSACHUSETTS, ASSIGNOR TO CHARLES S. MARSH, OF WINCHESTER, MASSACHUSETTS.

COIN-CONTROLLED WEIGHING-MACHINE.

979,372.

Specification of Letters Patent.

Patented Dec. 20, 1910.

Application filed April 7, 1909. Serial No. 488,500.

*To all whom it may concern:*

Be it known that I, GEORGE W. BOWERS, of Somerville, in the county of Middlesex and State of Massachusetts, have invented certain new and useful Improvements in Coin-Controlled Weighing-Machines, of which the following is a specification.

This invention relates to coin-controlled machines, and especially to weighing machines which include a scale platform adapted to support the person to be weighed, the platform being connected with a vertically movable anvil adapted to be depressed by the weight on the platform to an extent governed by the weight, a pointer shaft carrying a pointer which is movable over a fixed dial, a plunger adapted when released to impart a forward rotation to the pointer shaft and the pointer, the movements of the plunger and pointer being determined by the depression of the scale platform and anvil, and coin-controlled means for normally locking the pointer shaft and plunger to prevent the operation of the latter, said means being rendered operative by a coin introduced into the machine, the arrangement being such that the introduction of a coin causes the registration by the pointer and dial of the weight of a person standing on the platform.

The invention has for its chief object to enable the period of operation of the plunger, or in other words, the length of time intervening between the tripping action of the coin and the locking of the pointer shaft, which occurs after the weight has been registered, to be prolonged by simple and effective means, including a member carried by the fourth wheel shaft of a clock mechanism, said member coöperating with the coin-controlled means alternately in locking the pointer-carrying shaft and plunger, and in releasing said parts and prolonging the operative period of the plunger.

The invention also has for its object to provide other improvements looking to the simplicity, durability and effectiveness of a machine of the character above mentioned.

The invention consists in the improvements which I will now proceed to describe and claim.

Of the accompanying drawings, forming a part of this specification,—Figure 1 represents a front elevation of the coin controlled mechanism, the pointer being shown in dotted lines. Fig. 2 represents a top plan view of the mechanism shown in Fig. 1. Fig. 3 represents a fragmentary view showing the time mechanism released by a coin. Fig. 4 represents a section on line 4—4 of Fig. 1. Fig. 5 represents a front elevation showing the exterior of the entire machine. Fig. 6 represents a side elevation, parts of the casing being broken away, and parts of the mechanism being shown in section. Fig. 7 represents a side view of the anvil, and a portion of the rod which supports the same. Fig. 8 represents a section on line 8—8 of Fig 7. Fig. 9 represents a section on line 9—9 of Fig. 6.

The same reference characters indicate the same parts in all the figures.

The frame or casing of the machine comprises a hollow standard 12, a circular casing 13 mounted on the upper end of the standard, and containing the coin controlled pointer operating mechanism, a hollow base 14 on which the standard is supported, and a movable scale platform 15 mounted on the base, and adapted to be depressed by the weight of a person standing thereon, the usual or any suitable mechanism being employed for multiplying the movement of the platform and communicating it to the anvil 16 which limits the downward movement of the pointer actuating plunger, hereinafter described, the multiplying mechanism in the base including a lever 17 having a knife-edged trunnion which is engaged with a hook on the lower end of the rod 18 which supports the anvil 16. The rod 18 and the anvil are normally held at the upward extreme of their movement by a compression spring 19 bearing at one end on a support 20 affixed to the casing, and at its other end on a collar 21 having an adjustable screw thread connection with the rod 18. The lever 17 with the rod 18 and the anvil are depressed against the upward pressure of the compression spring 19 by the weight of a person standing on the platform, the extent of the depression of the platform and of the anvil being dependent on the weight of the person, as is usual in weighing machines of this character. The pointer 22 which coöperates with the dial 23 at the front of the casing 13, is affixed to a shaft 24 journaled in a fixed bearing 25. To said shaft is affixed a pinion 26 meshing with a rack 27 formed on the shank or stem 28 of a weighted plunger 29 which is movable in alinement with the anvil 16, the downward movement of the plunger being arrested by the anvil, and through its engagement with the pointer shaft by means of the rack and pinion, causing a partial rotation of the shaft and pointer, the extent of which is governed by the position of the anvil which, in turn, is governed by the weight of the person on the platform. The plunger is normally locked in its raised position by a ratchet 30 affixed to the shaft 24, and a pawl 31 pivoted at 32 to a fixed support and adapted to be engaged by its own weight with the ratchet to prevent rotation of the latter and of the pinion 26 in the direction involved by the downward movement of the plunger.

Coin controlled mechanism is provided for raising or tripping the pawl 31, and thus releasing the ratchet and the plunger to permit the descent of the latter, said mechanism comprising a two-armed lever 33 which is pivoted at 32 beside the pawl 31, and is engaged with the latter by means of a laterally projecting stud 34 on one of the arms of the lever, the pawl 31 resting on said stud. The lever 33 is weighted so that it normally stands in the position shown in Fig. 1, thus permitting the pawl to engage the ratchet 30. The outer arm of the lever 33 is provided with a flat seat 35 which is located under a coin chute 36, so that a coin dropping from said chute, encounters the seat 35 and depresses the outer arm of the lever, thus raising the inner arm and with it the pawl 31, as indicated in Fig. 3, the pawl being thus caused to release the ratchet 30 and the plunger.

Time mechanism is provided for holding the lever 33 and pawl 31 in the raised position last described, for a predetermined period, preferably about five seconds, to afford sufficient time for the depression of the scale platform and the actuation of the pointer to indicate the weight on the platform, before the plunger is again arrested by the pawl 31 and the intermediate mechanism. Said time mechanism includes a clock movement, which is preferably of the eight-day type, having two mainsprings, the barrels of which are shown at 37, 37 (Fig. 2). Said mechanism is of common and well-known construction, so that the only parts to which particular reference is necessary, are the fourth wheel 38, its shaft 39, and the balance wheel 40, these parts being specifically mentioned because they coöperate directly with the mechanism on my invention, hereinafter described.

41 represents a disk which is affixed to the fourth wheel shaft 39, and is provided in its periphery with a series of radial notches 42. The fourth wheel shaft makes a complete rotation, as usual, in each minute, the disk 41 being of course rotated at the same rate.

The inner arm of the lever 33 is provided with a tooth 43 adapted to drop into a notch 42, and thus arrest the disk 41 when the lever is in its normal position shown in Fig. 1. When the lever is displaced by the weight of a coin upon its outer arm, as shown in Fig. 3, the tooth 43 is withdrawn from the disk, so that the disk is released and immediately commences to rotate before the tooth has time to descend into the same notch. The tooth therefore bears upon the periphery of the disk between the notch last engaged by it and the next notch, the lever and the pawl 31 being therefore held in the raised position shown in Fig. 3, until the disk has rotated a distance equal to the space between two adjacent notches. In the present instance, I have shown the disk provided with twelve notches, so that each of the peripheral portions between the notches is adapted to support the lever and pawl in their raised positions for a period of five seconds. This period is sufficient to insure the actuation of the pointer by the descent of the plunger after the coin has been deposited, and the registration of any weight deposited on the platform prior to or during said period, the plunger and pointer being automatically locked after the expiration of the period, so that it will be impossible to secure the registration of another weight without first depositing another coin.

It will be seen from the foregoing that the pointer shaft 24 and the fourth wheel shaft 39 are simultaneously unlocked or released by the descent of a coin upon the lever 33, and are held released and allowed to operate for a predetermined period, after which they are simultaneously locked by the simultaneous downward movement of the lever tooth 43 and pawl 41.

To cause the stoppage or release of the balance wheel simultaneously with the stoppage and release of the fourth wheel shaft, I provide a detent arm 44 which is pivoted at 45 and rests loosely on a stud 46 projecting laterally from one side of an ear on the locking lever 33, one end of said detent arm being bent laterally and projecting over the periphery of the balance, which is provided with a series of radial pins 47. When the locking lever 33 is depressed and in engagement with the disk 41, the detent arm 44 comes in contact with the periphery of the balance between two adjacent pins, and by engaging one of said pins, stops the oscillation of the balance at the same moment that the disk 41 is locked by the tooth 43. The detent arm 44 is raised from engagement with the balance by the upward movement of the locking lever 33 due to the descent of a coin upon its outer arm, hence the balance and the disk 41 are released simultaneously. One function of the balance detent 44 is to quickly stop the balance and prevent unnecessary movements, not only of the balance, but also of the adjacent parts of the escapement and other mechanism that would be effected by the diminishing oscillations of the balance while it is coming to a state of rest. Another and more important function of the balance detent is to insure the stoppage of the balance while it is "off center," or in other words, while the hair spring 48 is under tension, so that when the balance is released, it will start quickly. The pins 47 are so arranged that when the balance is arrested by the engagement of the detent 44 with either of the pins, the hair spring 48 will be under tension instead of being at a state of rest.

The operation of the above described mechanism is as follows:—The ratchet 30 and disk 41 being locked by the lever 33 and pawl 31, and the balance 40 being arrested by the detent 44, the machine is in readiness for the weighing operation. The depression of the outer arm of the lever 33 by a coin dropping upon it from the chute 36 simultaneously raises the locking arm of the lever 33, the pawl 31, and the balance detent 44. The person operating the machine having mounted the platform 15, before depositing the coin, causes the depression of the anvil 16, so that the plunger 29, which is now released and free to act, drops as far as the depression of the anvil will permit. The rotation of the disk 41, which commences immediately upon the withdrawal of the locking lever tooth 43 therefrom, causes a portion of the periphery of the disk to move under the tooth 43 before the latter has time to descend after being raised by the coin. The locking lever, pawl, and balance detent therefore remain raised and inoperative until the next notch 42 registers with the tooth 43 of the locking lever, this occurring in about five seconds after the tripping of the locking lever, pawl, and detent by the coin. The ratchet 30, disk 41, and balance 40 are therefore simultaneously arrested, so that no further accurate operation of the pointer by the plunger 29 is possible until another coin has been deposited.

It will be seen that by utilizing the fourth wheel shaft of a clock movement to time the tripping of the pawl which locks the pointer-operating plunger, I am enabled to accurately determine the length of time during which the pawl is tripped by very simple means, such as the notched disk 41 which can be attached to the fourth wheel shaft in any suitable way, and can be notched to trip the pawl 31 for any desired length of time after the insertion of each coin, the disk rotating once a minute, so that its periphery may be subdivided into sections of any desired length, and causing any desired period during which the pawl is tripped.

As shown in Fig. 4, the fourth wheel shaft 39, while in alinement with the pointer shaft 24, is not connected therewith, the pointer shaft being free to rotate independently of the fourth wheel shaft, so that the pointer shaft and its ratchet and pinion are adapted to rotate in either direction independently. Provision is thus made for a free oscillating movement of the pointer shaft and the parts attached thereto by such fraudulent movements of the platform as are likely to be caused by parties attempting to operate the machine by jumping on the platform and moving it abruptly without inserting a coin, these fraudulent attempts causing oscillating movements of the pointer shaft and its pawl and pinion without injuring the clock or other mechanism in any way. To minimize the wear of the ratchet 30 and pawl 31 by the above mentioned fraudulent movements, I interrupt the continuity of the teeth of the ratchet 30, thus providing a smooth segmental peripheral space 49 which supports the pawl 31 during the oscillating movements imparted to the ratchet by such fraudulent efforts.

The vertical movements of the plunger 29 and its shaft 28 are limited by fixed stops which are provided by a fixed member 50 of the supporting frame, said member having guides in which the plunger is fitted to slide. The lower end of the member 50 forms a stop which abuts against the upper end of the plunger and limits the upward movement of the plunger, the upper portion of the plunger being provided with a laterally projecting stop stud or pin 51 which abuts against the upper end of the member 50 and limits the downward movement of the plunger. When the anvil 16 is in its normal raised position, the plunger is supported thereby in the position shown in Fig. 1, the pawl being at one end of the smooth portion 49 and bearing against the ratchet teeth at one end of said portion, the stop pin 51 being then elevated above the frame member 50, and the plunger 29 located at a considerable distance below the lower end of said frame member. When the parts are in this position, the plunger is free to have a limited upward movement by an agitation or rapid alternate depression and release of the platform due to the fraudulent efforts above referred to. The smooth portion 49 is of such length that in case the plunger is moved to the extreme of its upward movement, (which is determined by the lower end of the frame member 50) the portion 49 will not be turned out of contact with the pawl but will remain in contact therewith, so that the wear of the mechanism due to fraudulent efforts is reduced to the minimum.

As indicated in Fig. 5, the graduated portion of the dial is segmental and occupies less than, and preferably three-quarters of a complete circle. When the mechanism is at rest and the pawl 31 is engaged with the ratchet teeth at one end of the smooth portion 49, as shown in Fig. 1, the pointer coincides with the zero mark at one end of the segmental graduated portion of the dial. The stud 51 on the plunger shank is intended to prevent the said shank from dropping out of its guide in the frame member 50 before the parts are fully assembled. The portion of the dial which is not graduated corresponds in extent with the smooth portion 49 of the ratchet, the graduated portion of the dial therefore corresponding in extent to the toothed portion of the ratchet, so that movements of the hand which occur while the pawl 31 is in contact with the smooth portion 49 are not registered, the pointer being then over the portion of the dial which is not graduated.

The upper end portion of the anvil rod 18 is guided by an ear 51 having an orifice through which the rod passes. Said ear is provided with two curved spring resilient arms 52, preferably made integral with the ear, and formed to spring outwardly into frictional engagement with the inner surface of the hollow standard 12, the guides being supported in the standard wholly by said frictional engagement. The said guide, which may be made from a single piece or blank of spring sheet metal, constitutes a simple and easily applied means for guiding the upper portion of the anvil rod.

To provide simple and efficient means for adjustably connecting the anvil 16 with the rod 18, and preventing accidental displacement of the anvil from its predetermined adjustment, I provide the upper end portion of the anvil rod with a slot 53 (Fig. 7), and with a screw thread which includes the slotted portion of the rod. The anvil is provided with an internally screw threaded socket 54 adapted to engage the thread on the rod.

55 represents a nut engaged with the threaded portion of the rod, and 56 represents a lock washer adapted to surround the rod and provided with a tongue 57 engaging the slot 53, as shown in Fig. 8. The anvil may be adjusted by rotating it upon the threaded portion of the rod until the desired adjustment is obtained, after which the nut 55 is turned upwardly until the washer 56 is pressed against the lower end of the anvil, and has a firm frictional hold thereon, said nut and washer preventing accidental rotation of the anvil. The upper end of the anvil is preferably convex, as shown in Fig. 7, so that the point of contact between the plunger and the anvil is at the longitudinal center of the plunger.

58 represents a spring secured to the frame member 50, and bearing at 59 against the plunger shank 28 to press the rack 27 yieldingly against the pinion 26 and prevent a loose engagement of said parts.

I claim:

1. A weighing machine comprising a pointer-carrying shaft, a vertically movable pointer-operating member geared to the shaft, means for normally locking the shaft and its operating member to prevent forward rotation of the pointer, coin-actuated means for releasing the shaft and permitting its forward rotation by the operating member, and a clock mechanism having on its fourth wheel shaft a member which coöperates with the said coin-actuated releasing means in simultaneously locking the pointer shaft, its operating member, and the clock mechanism, and in prolonging the operative period of the pointer-operating member after the insertion of a coin.

2. A weighing machine comprising a pointer-carrying shaft, a vertically movable pointer-operating member geared to the shaft, means for normally locking the shaft and its operating member to prevent forward rotation of the pointer, coin-actuated means for releasing the shaft and permitting its forward rotation by the operating member, a clock mechanism having on its fourth wheel shaft a member which coöperates with the said coin-actuated releasing means in simultaneously locking the pointer shaft, its operating member, and the clock mechanism, and in prolonging the operative period of the pointer-operating member after the insertion of a coin, said clock mechanism having a balance wheel, and a balance detent operated by the coin-actuated releasing means to alternately stop and release the balance wheel.

3. A weighing machine comprising a pointer-carrying shaft, a pinion and a ratchet affixed thereto, a vertically movable plunger provided with a rack engaged with the said pinion, a pawl which normally engages the ratchet and prevents the descent of the plunger and the forward rotation of the pointer shaft thereby, coin-actuated means for tripping the pawl to release the pointer shaft and plunger, and clock mechanism having a notched disk affixed to the fourth wheel shaft of said mechanism, and adapted to coöperate with the said coin-actuated means in holding the pawl in its tripped position for a predetermined period and thereafter in locking the clock mechanism, the pointer shaft and the plunger.

4. A weighing machine comprising a pointer-carrying shaft, a pinion and a ratchet affixed thereto, a vertically movable plunger provided with a rack engaged with the said pinion, a pawl normally engaging the ratchet to prevent the descent of the plunger and the forward rotation of the pointer shaft thereby, coin controlled means for tripping the pawl, said means including a lever engaged with the pawl and having a locking tooth, and a clock mechanism having on its fourth wheel shaft a disk, the periphery of which is interrupted by notches adapted to receive said tooth and permit the depression of the lever and the engagement of the ratchet by the pawl, the periphery of the disk between the notches being adapted to support the lever and pawl for a predetermined period in a raised position with the pawl disengaged from the ratchet, the clock mechanism being locked by the engagement of the lever tooth with a notch in the disk.

5. A weighing machine comprising a pointer-carrying shaft, a pinion and a ratchet affixed to said shaft, a vertically movable plunger provided with a rack engaged with said pinion, a pawl which normally engages the ratchet to prevent a downward movement of the plunger, and a forward rotation of the pointer shaft thereby, a clock mechanism having a notched locking disk on its fourth wheel shaft, a spring balance wheel having projecting pins on its periphery, a pivoted coin-controlled locking lever having a tooth arranged to bear on the periphery of the locking disk, (said periphery supporting the lever in a raised position), and to enter a notch in the disk to simultaneously cause the depression of the lever and the locking of the clock mechanism, and a detent arm which normally engages a pin on the balance to arrest the movement of the latter while its spring is under tension, the said pawl and detent arm being engaged with the locking lever and simultaneously movable thereby out of and into engagement with the ratchet and balance respectively.

6. A weighing machine comprising a weight-controlled anvil, a pointer-carrying shaft, a pinion and a ratchet affixed to said shaft, a plunger movable vertically in alinement with the anvil, and provided with a rack engaged with said pinion, a pawl which normally engages the ratchet to prevent a downward movement of the plunger and a forward rotation of the pointer shaft thereby, and coin-controlled means for disengaging the pawl from the ratchet, the continuity of the ratchet teeth being interrupted to form a smooth peripheral portion which permits a limited backward rotation of the shaft and ratchet by an upward movement of the plunger, without contact between the pawl and the ratchet teeth, and means for limiting the upward movement of the plunger.

7. A weighing machine comprising a clock mechanism having a notched disk on its fourth wheel shaft, a pointer-carrying shaft in alinement with said shaft and rotatable independently of the latter, a pinion and a ratchet affixed to the pointer shaft, a vertically movable plunger provided with a rack engaging said pinion, a pawl which normally engages the ratchet to prevent a downward movement of the plunger, and a forward rotation of the pointer thereby, and a locking lever having a coin-engaging outer arm and a locking arm provided with a tooth adapted to alternately engage the periphery of the said disk, and a notch therein, the said locking arm having a loose lifting engagement with the pawl.

8. A weighing machine comprising a clock mechanism having a notched disk attached to its fourth wheel shaft, and a spring balance wheel provided with pins on its periphery, a pointer-carrying shaft in alinement with said shaft and rotatable independently thereof, a pinion and a ratchet affixed to the pointer shaft, a vertically movable plunger provided with a rack engaging said pinion, a pawl which normally engages the ratchet to prevent a downward movement of the plunger and a forward rotation of the pointer thereby, a locking lever having a coin-engaging outer arm and a locking arm provided with a tooth adapted to alternately engage the periphery of said disk, and a notch therein, the said locking arm having a loose lifting engagement with the pawl, and a balance detent adapted to engage a pin on the balance by gravitation, and adapted to be lifted by the locking lever.

9. A weighing machine comprising a shaft carrying a pointer, a pinion and a ratchet affixed to said shaft, said ratchet having its teeth interrupted so that they form a segmental series, the ends of which are separated by a smooth portion, a vertically movable plunger having a rack engaged with said pinion, a dial having a segmental graduated portion occupying less than a complete circle, and corresponding in extent to the toothed portion on the ratchet, and a pawl which normally bears on the ratchet and is adapted to prevent the descent of the plunger, and coin actuated means for tripping the pawl to release the ratchet.

In testimony whereof I have affixed my signature, in presence of two witnesses.

GEORGE W. BOWERS.

Witnesses:
C. F. BROWN,
P. W. PEZZETTI.